(12) United States Patent
Arora et al.

(10) Patent No.: US 8,010,339 B2
(45) Date of Patent: Aug. 30, 2011

(54) STORAGE DEVICE THAT PROVIDES EFFICIENT, UPDATABLE NATIONAL LANGUAGE SUPPORT FOR A MOBILE DEVICE

(75) Inventors: Nathan Charu Arora, Kirkland, WA (US); Chigusa Yasuda Sansen, Bellevue, WA (US); Daryn Robbins, Issaquah, WA (US); Mark Tonkelowitz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 12/031,266

(22) Filed: Feb. 14, 2008

(65) Prior Publication Data

US 2009/0210216 A1 Aug. 20, 2009

(51) Int. Cl.
*G06F 17/20* (2006.01)
*G06F 17/28* (2006.01)

(52) U.S. Cl. .............. 704/8; 704/2; 704/7

(58) Field of Classification Search ............ 704/1–10
See application file for complete search history.

(56) References Cited

U.S. PATENT DOCUMENTS

| | | | | |
|---|---|---|---|---|
| 6,252,589 B1* | 6/2001 | Rettig et al. | | 715/703 |
| 6,490,547 B1* | 12/2002 | Atkin et al. | | 704/8 |
| 6,507,813 B2 | 1/2003 | Veditz et al. | | 704/8 |
| 6,526,426 B1* | 2/2003 | Lakritz | | 715/264 |
| 6,546,365 B1 | 4/2003 | Gajda et al. | | 704/8 |
| 7,305,376 B2* | 12/2007 | Wu et al. | | 707/693 |
| 7,340,389 B2* | 3/2008 | Vargas | | 704/8 |
| 7,571,092 B1* | 8/2009 | Nieh | | 704/2 |
| 7,580,951 B2* | 8/2009 | Blair-Stanek | | 1/1 |
| 7,681,127 B2* | 3/2010 | Thurston | | 715/265 |
| 7,747,588 B2* | 6/2010 | Thompson et al. | | 707/694 |
| 2002/0116172 A1* | 8/2002 | Vargas | | 704/8 |
| 2002/0177993 A1 | 11/2002 | Veditz et al. | | 704/8 |
| 2003/0004704 A1* | 1/2003 | Baron | | 704/8 |
| 2003/0046059 A1* | 3/2003 | Litster et al. | | 704/8 |
| 2003/0093465 A1* | 5/2003 | Banerjee et al. | | 709/203 |
| 2003/0131320 A1* | 7/2003 | Kumhyr et al. | | 715/536 |
| 2004/0088155 A1* | 5/2004 | Kerr et al. | | 704/8 |
| 2004/0111254 A1* | 6/2004 | Gogel et al. | | 704/8 |

(Continued)

FOREIGN PATENT DOCUMENTS

EP 0 335 139 A2 3/1989
WO WO 2007/032021 A2 3/2007

OTHER PUBLICATIONS

Weston, (David ) G.D.A., "National Language Architecture," 1992, http://delivery.acm.org/10.1145/970000/962205/p59-weston.pdf?key1=962205&key2=3103854811&coll=GUIDE&dl=GUIDE& CFID=28551254&CFTOKEN=79501095, pp. 59-69, including 2 web pages documenting the publication date of the article.

(Continued)

*Primary Examiner* — James S. Wozniak
*Assistant Examiner* — Jialong He
(74) *Attorney, Agent, or Firm* — Merchant & Gould

(57) ABSTRACT

Efficient, updatable national language support for a mobile device is provided. NLS file segments are provided in a wrapper in the Virtual NLS file. Segments may be organized by language family. The number of segments that need to be searched is also minimized. At any point, any of the pointers for the dynamically updatable query table can be shifted around to improve performance. Existing APIs may be used for obtaining locale information by causing the APIs to iterate through all the known NLS segments in a specified search order.

16 Claims, 5 Drawing Sheets

U.S. PATENT DOCUMENTS

| | | |
|---|---|---|
| 2005/0137845 A1 | 6/2005 | Carroll et al. ............... 704/2 |
| 2005/0228638 A1 | 10/2005 | Muramatsu ............... 704/7 |
| 2005/0283359 A1* | 12/2005 | Lin et al. ............... 704/8 |
| 2006/0047499 A1 | 3/2006 | Chen et al. ............... 704/8 |
| 2006/0080358 A1* | 4/2006 | Blair-Stanek ............... 707/104.1 |
| 2006/0136907 A1* | 6/2006 | Bennett et al. ............... 717/174 |
| 2007/0016892 A1* | 1/2007 | Cao ............... 717/127 |

OTHER PUBLICATIONS

Oracle8*i* National Language Support Guide Release 8.1.5, "Understanding Oracle NLS," 1999, Oracle Corporation, http://lbdwww.epfl.ch/f/teaching/courses/oracle8i/server.815/a67789/chl.htm, 6 pages.

* cited by examiner

STORAGE DEVICE THAT PROVIDES EFFICIENT, UPDATABLE NATIONAL LANGUAGE SUPPORT FOR A MOBILE DEVICE

BACKGROUND OF THE INVENTION

International distribution of mobile devices is complicated by the need to provide support for different languages. Such support is often referred to as National Language Support (NLS). NLS provides culture-sensitive and locale-sensitive information such as regional settings, calendar information, and date/time formatting. However, NLS is more than merely converting a system to a second language.

To support a national language, a universal device must be adaptable to any particular market or locale. A NLS device must operate with immunity from any problems that arise due to the use of different sets of characters or words. Such a system must include facilities to render the interacting characters or words different for each language.

NLS capable devices have been produced that allow manufacturers to readily install each set of characters and to efficiently change from one set of characters to another set of characters. Currently, for Windows CE and Windows Mobile, this information is contained in a ROM-based file that cannot be updated after the device has shipped.

One particular problem with providing NLS support is being able to update the NLS file after the device has shipped. For example, a first device may be configured for English, but a second device sends an email to the first device in Chinese. In this situation, the first device cannot communicate with the second device in a familiar language. Moreover, without locale specific information, the first device may not even be able to read the message from the second device because the proper code pages are not on the first device. Accordingly, the NLS file for the first mobile must be updated or changed. To change the NLS for the first mobile device, the NLS file must be included in the base NLS file.

Accordingly, the NLS support for another language or locale is not shown until the user initiates a change to the mobile device that implements a new NLS file. Because all NLS that is likely to be used must be provided in the base NLS file, the NLS file is very large. If new locale information is merged with the original NLS file, having one monolithic language file in embedded devices may cause several problems including performance and space issues. Moreover, the computing capability of such devices is limited. Merging two pieces of NLS data, for example at boot time or at run time, take too much time. Furthermore, searching through such a large file would waste too much time thereby frustrating the user.

It is with respect to these and other considerations that the present invention has been made.

SUMMARY OF THE INVENTION

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

In accordance with one embodiment, a virtual national language support file includes a wrapper for providing logical binding to predetermined content and a plurality of national language support file segments logically bound by the wrapper, wherein the plurality of national language support file segments include a national language support base segment providing first locale data and at least one national language support segment for providing second locale data.

According to another embodiment, a method for providing a virtual national language support file includes providing a plurality of national language support file segments, wherein the plurality of national language support file segments include a national language support base segment providing first locale data and at least one national language support segment for providing second locale data and logically binding the plurality of national language support file segments in a wrapper.

According to another embodiment, a method for dynamically updating a virtual national language support file includes loading new national language support data on a device, determining whether a user initiates an update to the virtual national language support file, mapping new national language support data as a new primary language when a user initiates an update to the virtual national language support file, and otherwise, determining whether application programming interfaces reflect locale data usage common to the new national language support data and searching for new national language support data matching the locale data usage.

According to another embodiment, a computer-readable medium that stores a set of instructions which when executed performs a method for dynamically updating a virtual national language support file is provided. The method executed by the set of instructions includes loading new national language support data on a device, determining whether a user initiates an update to the virtual national language support file, mapping new national language support data as a new primary language when a user initiates an update to the virtual national language support file, and otherwise, determining whether application programming interfaces reflect locale data usage common to the new national language support data and searching for new national language support data matching the locale data usage.

According to another embodiment, a computer-readable medium that stores a set of instructions which when executed performs a method for providing a virtual national language support file is provided. The method executed by the set of instructions includes providing a plurality of national language support file segments, wherein the plurality of national language support file segments include a national language support base segment providing first locale data and at least one national language support segment for providing second locale data and logically binding the plurality of national language support file segments in a wrapper.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

Referring now to the drawings in which like reference numbers represent corresponding parts throughout.

DETAILED DESCRIPTION OF THE INVENTION

In the following detailed description, references are made to the accompanying drawings that form a part hereof, and in which are shown by way of illustrations specific embodiments or examples. While several exemplary embodiments and features of the invention are described herein, modifications, adaptations and other implementations are possible, without departing from the spirit and scope of the invention. These embodiments may be combined, other embodiments may be utilized, and structural changes may be made without departing from the spirit or scope of the present invention. Accordingly, the following detailed description does not limit the invention. Instead, the proper scope of the invention is defined by the appended claims.

Embodiments of the present invention provide a method, apparatus and program storage device that enables efficient, updatable National Language Support for a mobile device. Herein, mobile device also refers to any embedded device that uses locale specific information, e.g., involves messaging, browsing the web, sorting databases, sorting names such as localized names or any localized data in a database, calendaring, number format, data format.

Figure 1:
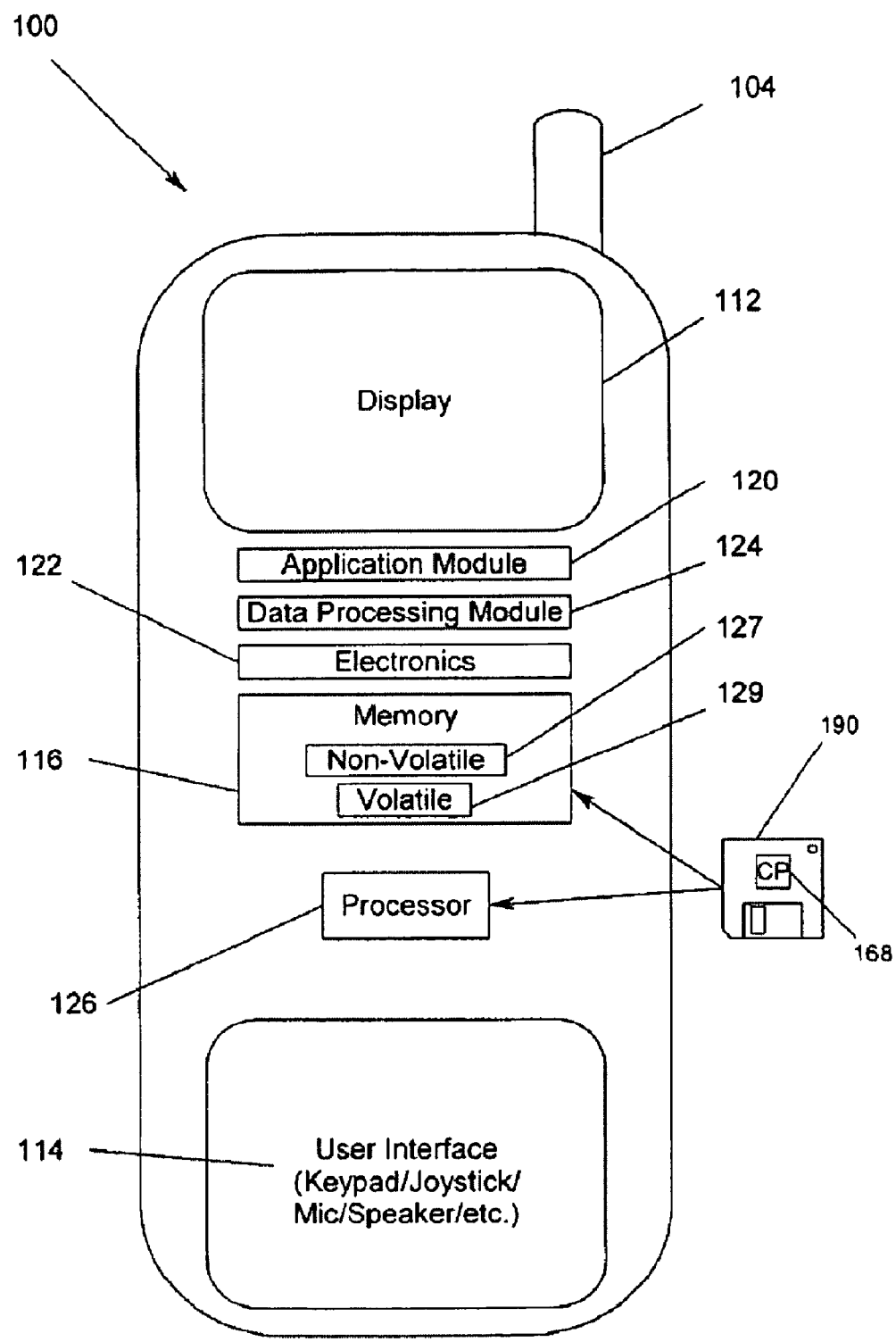
FIG. 1 is a block diagram of a mobile device according to an embodiment of the present invention.

FIG. 1 is a block diagram of a mobile device 100 according to an embodiment of the present invention. In FIG. 1, a mobile device 100 is represented using a mobile phone. The mobile device includes processor 126 that may be configured to cause applications module 120 to execute programs that implement application features, such as National Language Support (NLS) according to embodiments of the present invention. Processor 126 may also be configured to execute programs that implement additional application features, such as video encoding and decoding, camera support, and MP3 audio player support. Electronic circuitry 122 enables the transmission and reception of radio signals over the antenna 104 of phone 100. These signals are converted to digital form and communicated with data processing module 124, which may also be controlled by processor 126. Control of the transceiver and implementation of cellular communications protocols is handled by data processing module 124.

Information such as phone numbers, call status, and menus are displayed to a phone user on display 112, which may be a liquid crystal display (LCD). User interface 114, e.g., a keypad, joystick, etc., accepts user-inputted phone numbers and text, with keys for sending and ending a call in addition to numeric telephone keys. Control over keypad 114 is handled by data processing module 124, while display 112 is controlled by applications module 120. Those skilled in the art will recognize that the block diagram of the mobile device 100 is presented as illustration of one embodiment of a mobile phone. A mobile device 100 according to embodiments of the present invention may include additional or different features, such as a slide-out QWERTY keyboard, a touch pad, etc.

Separate processors, although not shown in FIG. 1, may be provided to implement the modules to provide a more robust phone platform. Additional processors, not shown, may also be implemented to provide capability for additional features, which may then be executed on processor 126.

User data such as call logs, phone numbers, and user preferences are stored in memory 116. A National Language Support (NLS) file may also be maintained in memory 116. Memory 116 can be non-volatile 127 and volatile 129 memories. Memory 116 can be accessed by data processing module 124 and/or by applications module 120. Some data must be transferred between data processing module 124 and applications module 120. For example, data may be received over the cell network by data processing module 124 and transferred to applications module 120 for further processing, or a digital camera image captured by applications module 120 may be sent to data processing module 124 for transmission over the cell network.

NLS according to embodiments of the present invention may take the form of an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 190 accessible from a computer-usable or computer-readable medium 168 providing program code for use by or in connection with a processor or any instruction execution system.

For purposes of this description, a computer-usable or computer readable medium 168 can be any apparatus that can contain, store, communicate, propagate, or transport the program for use by or in connection with the instruction execution system, apparatus, or device. The medium 168 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 126 coupled directly or indirectly to memory 116. The memory 116 can include local memory employed during actual execution of the program code, bulk storage, and cache memories which provide temporary storage of at least some program code in order to reduce the number of times code must be retrieved from bulk storage during execution.

Figure 2:
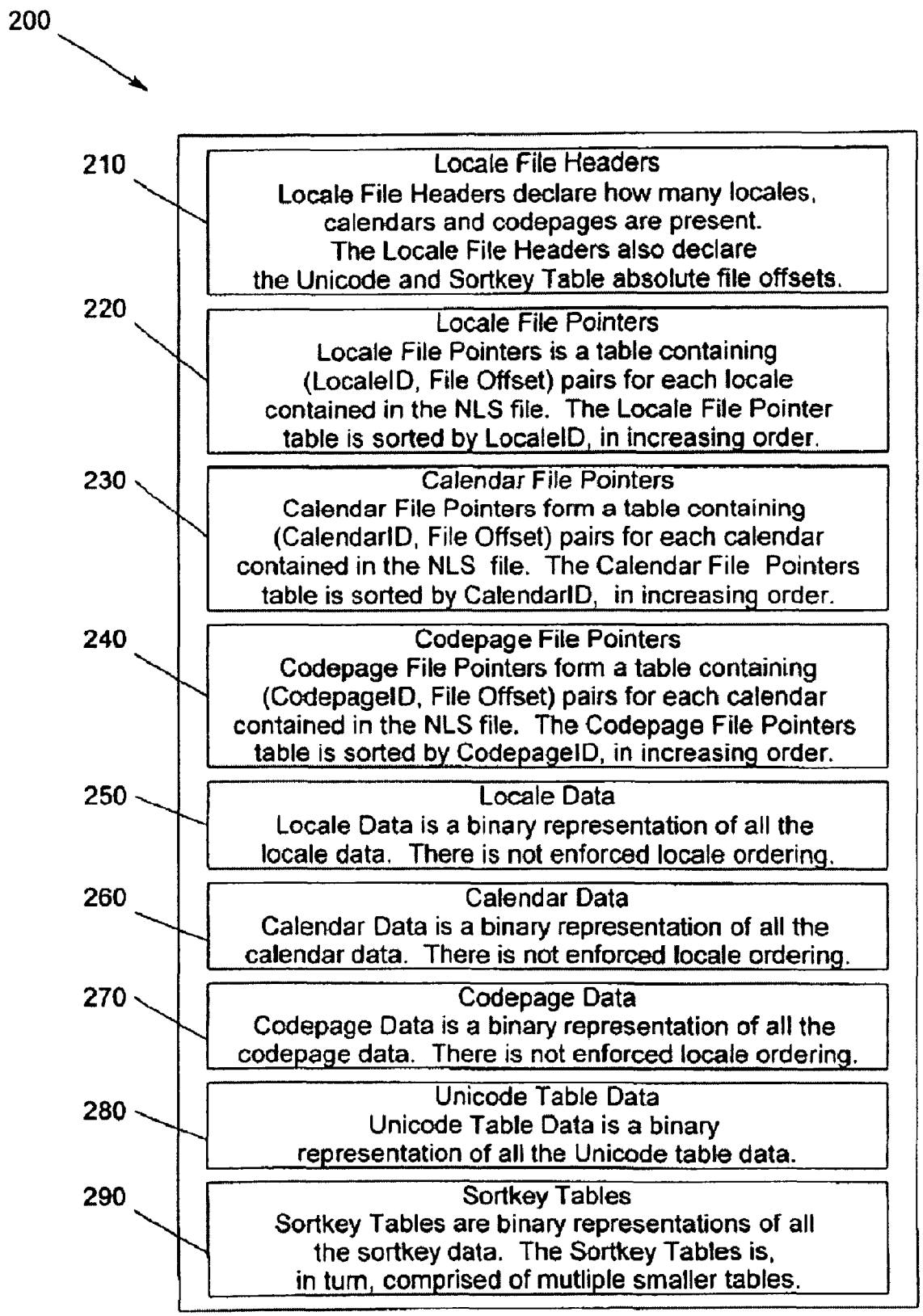
FIG. 2 shows the nine sections of an NLS file according to an embodiment of the present invention.

Accordingly, the computer program 190 comprises instructions which, when read and executed by the processor 126 of FIG. 1, causes the processor 126 to perform the steps necessary to execute the steps or elements of the present invention FIG. 2 shows the nine sections of an NLS file 200 according to an embodiment of the present invention. The NLS file 200 is a binary file generated by a NLS Compression tool. In FIG. 2, The Locale File Headers 210 are shown at the top. The Locale File Headers 210 declare how many locales, calendars and codepages are present. The Locale File Headers 210 also declare the Unicode and Sortkey Table absolute file offsets. The next section is the Locale File Pointers 220. The Locale File Pointers 220 is a table containing (LocaleID, File Offset) pairs for each locale contained in the NLS file 200. The Locale File Pointers 220 are sorted by LocaleID, in increasing order.

The third section is the Calendar File Pointers 230. The Calendar File Pointers 230 form a table containing (CalendarID, File Offset) pairs for each calendar contained in the NLS file 200. The Calendar File Pointers 230 are sorted by CalendarID, in increasing order. The fourth section is the Codepage File Pointers 240. The Codepage File Pointers 240 form a table containing (CodepageID, File Offset) pairs for each calendar contained in the NLS file 200. The Codepage File Pointers 240 are sorted by CodepageID, in increasing order.

The fifth section is the Locale Data 250. The Locale Data 250 is a binary representation of all the locale data. There is not enforced locale ordering. The sixth section is the Calendar Data 260. The Calendar Data 260 is a binary representation of all the calendar data. There is not enforced locale ordering. The seventh section is the Codepage Data 270. The Codepage Data 270 is a binary representation of all the codepage data. There is not enforced locale ordering. The eighth section is the Unicode Table Data 280. The Unicode Table Data 280 is a binary representation of all the Unicode table data. The ninth section is the Sortkey Tables 290. The Sortkey Tables 290 are binary representations of all the sortkey data. The Sortkey Tables 290 are, in turn, comprised of multiple smaller tables. Typically, an NLS file 200 ranges in size from 212 KB for English-based files to just over TMB, as is the case with East Asian files.

Figure 3:
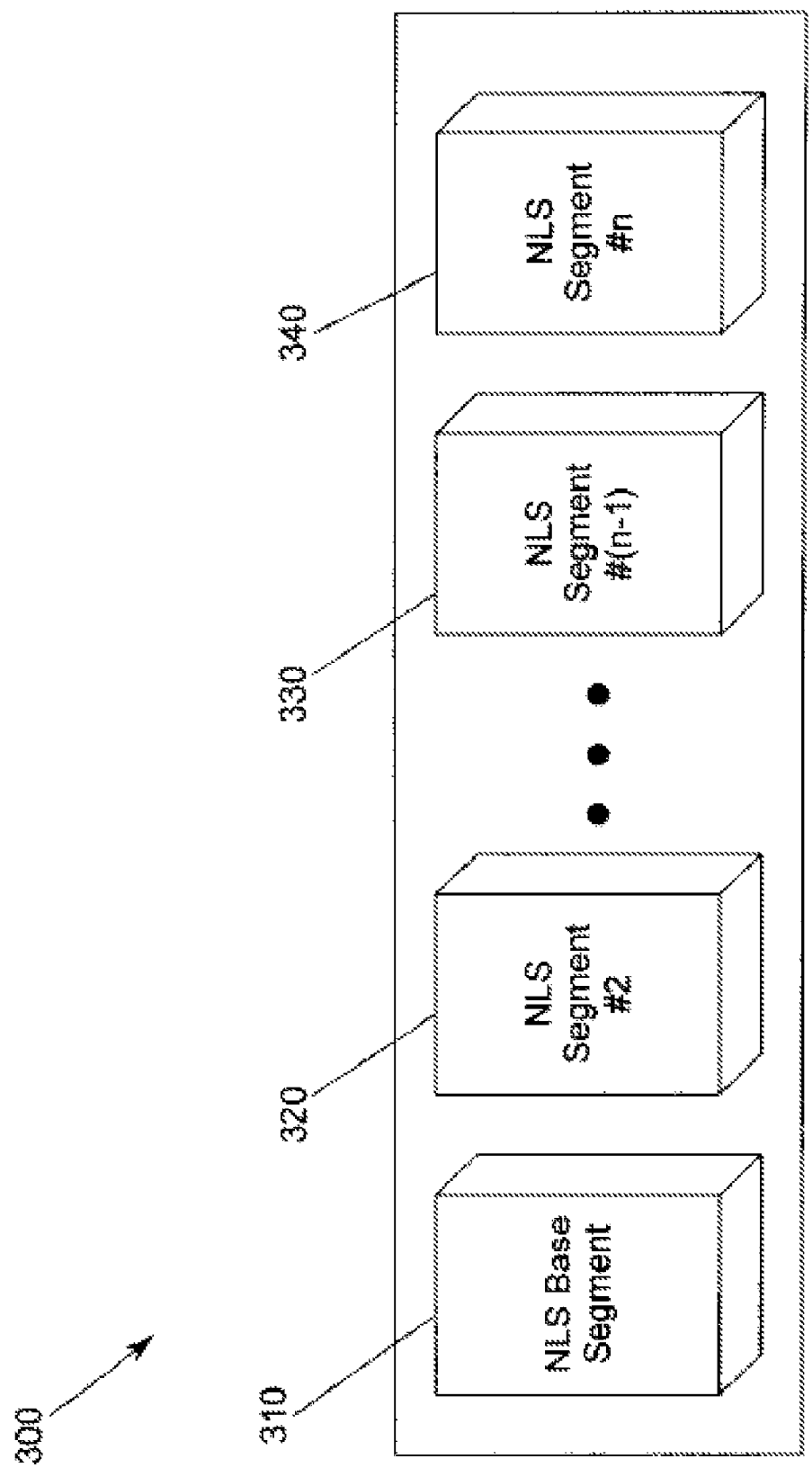
FIG. 3 is a diagram illustrating the Virtual NLS architecture according to an embodiment of the present invention.

FIG. 3 is a diagram illustrating the Virtual NLS architecture 300 according to an embodiment of the present invention. In FIG. 3, an NLS base segment 310 is shown. Thereafter, additional segments 320-340 may be provided. The use of separate NLS file segments for providing locale file headers, locale data, pointers, file folders, etc., as shown in FIG. 2, allows NLS to be dynamically configured using NLS for each language type.

The base segment 310 is a special segment because it is the first segment in the Virtual NLS search order. The base NLS segment 310 is the first segment queried during searches. The base segment 310 is organized to contain the majority of the queried NLS data, including the Unicode table data. To use space efficiently, each segment 310-340 may be as small as a single locale/calendar/codepage. This allows language pack hotfixes, i.e. Quick Fix Engineering (QFEs) to be installed, possibly even wirelessly. The Virtual NLS file 300 thus does not impact device performance or significantly increase the ROM footprint (size).

The Virtual NLS architecture 300 shown in FIG. 3 breaks away from the existing single-file architecture of NLS and allows multiple NLS segments 310-340 to be the source of NLS data. A device may be configured to initiate a query at boot-up, for example, using a special file format, i.e., a start NLS file (_____.start.nls). Those skilled in the art will recognize that embodiments of the present invention are not restricted to NLS selection at boot up. Whenever a new language segment is discovered, the new language segment 320-340 may be added to the search table. NLS files 300 may be located in ROM or they may be in user store. Both areas are available for search.

As shown in FIG. 3, multiple NLS segments 310-340 are virtually, i.e., logically, not physically, joined together and act as a single, well-orchestrated NLS file 300. Accordingly, the Virtual NLS 300 allows NLS data, e.g., individual segments 310-340, to be updated after the device has shipped through a variety of techniques, e.g., downloadable language packs; over-the-air Image Update; and, pre-installed transaction-safe FAT (TFAT) files. Virtual NLS 300 allows NLS data to be composed of multiple segments 310-340 that, once installed, have behavior and performance characteristics that are similar to a single, monolithic NLS file.

Accordingly, the Virtual NLS 300 allows a user to augment a device's language and locale data after the device has shipped using componentized locale/language segments in a way that does not significantly affect performance and is memory-efficient. The Virtual NLS 300 allows the user to decide which language to install on the device. The user may change the locale to a particular supported locale, e.g., Japanese locale, to be able to receive messages and send messages in Japanese without changing the user location. The componentized NLS segments 310-340 still offer performance that is comparable to a monolithic NLS database. This can be realized through a variety of techniques as described below.

Segments 320-340 may be organized by language family. Such an arrangement closely mimics actual world regions that are frequently grouped together for marketing and distribution of mobile devices. Thus, the Virtual NLS file format 300 allows the number of language segments 320-340 that need to be present on the device to be minimized. As a result, the number of segments 310-340 that need to be searched is also minimized. For example, if the NLS database in one monolithic NLS database, the device has to search through the NLS for a particular set of table pointers to identify that locale information, which could take a very long time. In contrast, the use of NLS segments 310-340 allows the user to use a dynamically modifiable search order that may be optimized so that the bulk of the language queries have a high-hit rate. In addition, more than one of the NLS file segment, e.g., 320 may contain the same locale information. Thus, when a locale is found, the search process may stop looking for that file in the other file segments, e.g., 330-340.

Figure 4:
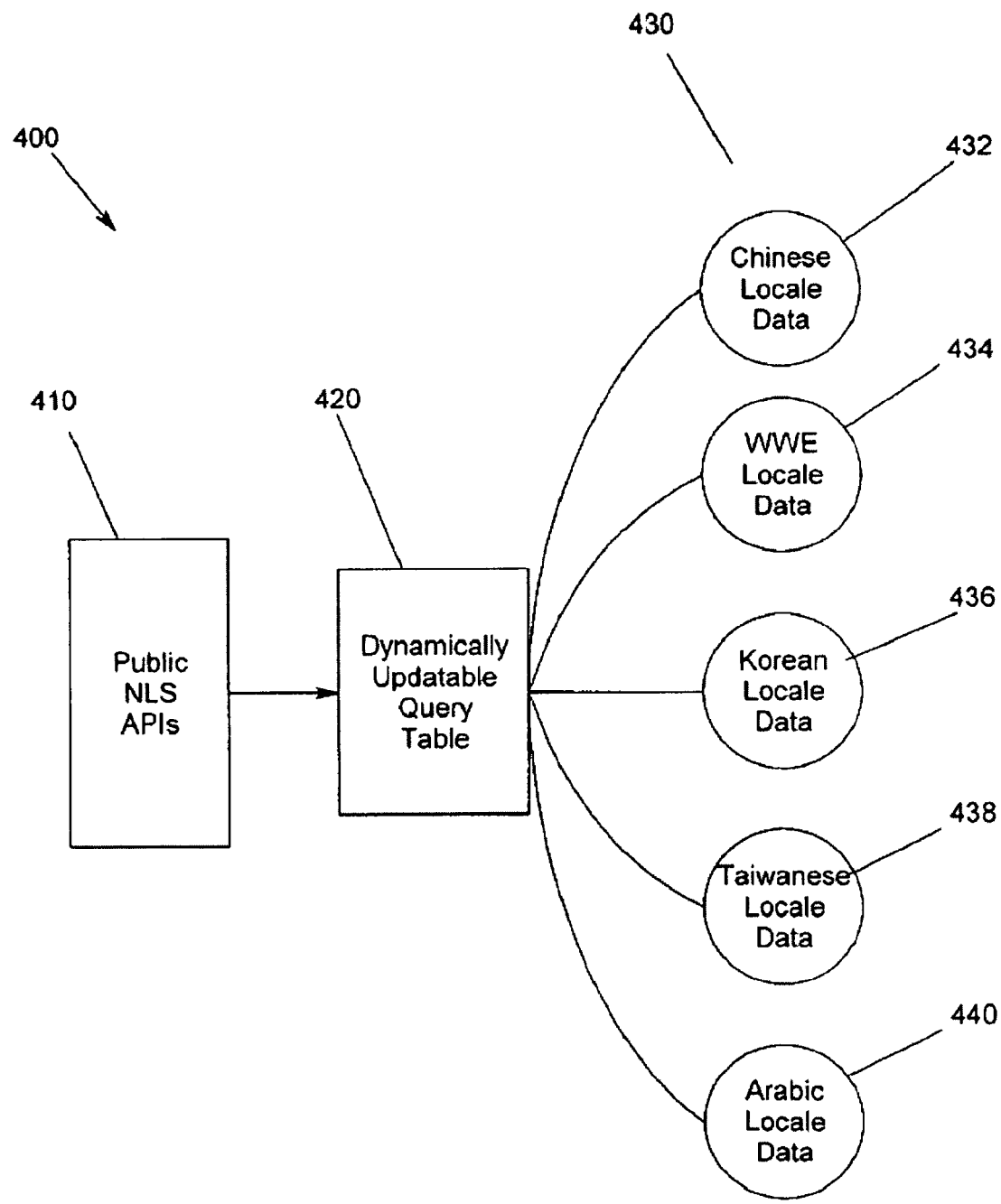
FIG. 4 illustrates the three distinct aspects of the Virtual NLS according to an embodiment of the present invention.

FIG. 4 illustrates the three distinct aspects of the Virtual NLS 400 according to an embodiment of the present invention. In FIG. 4, the separate and de-coupled pieces include Public NLS APIs 410, a Dynamically Updatable Query Table 420, and distinct locale data segments 430. For example, as shown in FIG. 4, the distinct locale data 430 includes Chinese locale data 432, World-Wide English (WWE) locale data 434, Korean locale data 436, Taiwanese locale data 438 and Arabic locale data 440. As should be appreciated, the locale data illustrated in FIG. 4 are for purposes of example and are not limiting of the many language locales applicable to embodiments of the invention.

At any point, any of the pointers for the dynamically updatable query table 420 can be shifted around to improve performance. The impetus of this performance improvement can be a change in the device's current language value, for instance, where the public APIs tend to be called a lot with a particular locale ID (LCID), or where an LRU algorithm identifies certain pointers that are used a lot.

Having a dynamically updatable table 420 means that additional NLS segments 430 can be integrated onto the device without a physical merge. Instead, only one pointer needs to be added to the dynamically updatable query table 420. Updatable language and locale components can be extended to other language features that provision the device for particular cultures and regions. Additionally, the concept applies to other domains such as device provisioning features such as .DAT File System provisioning.

Figure 5:
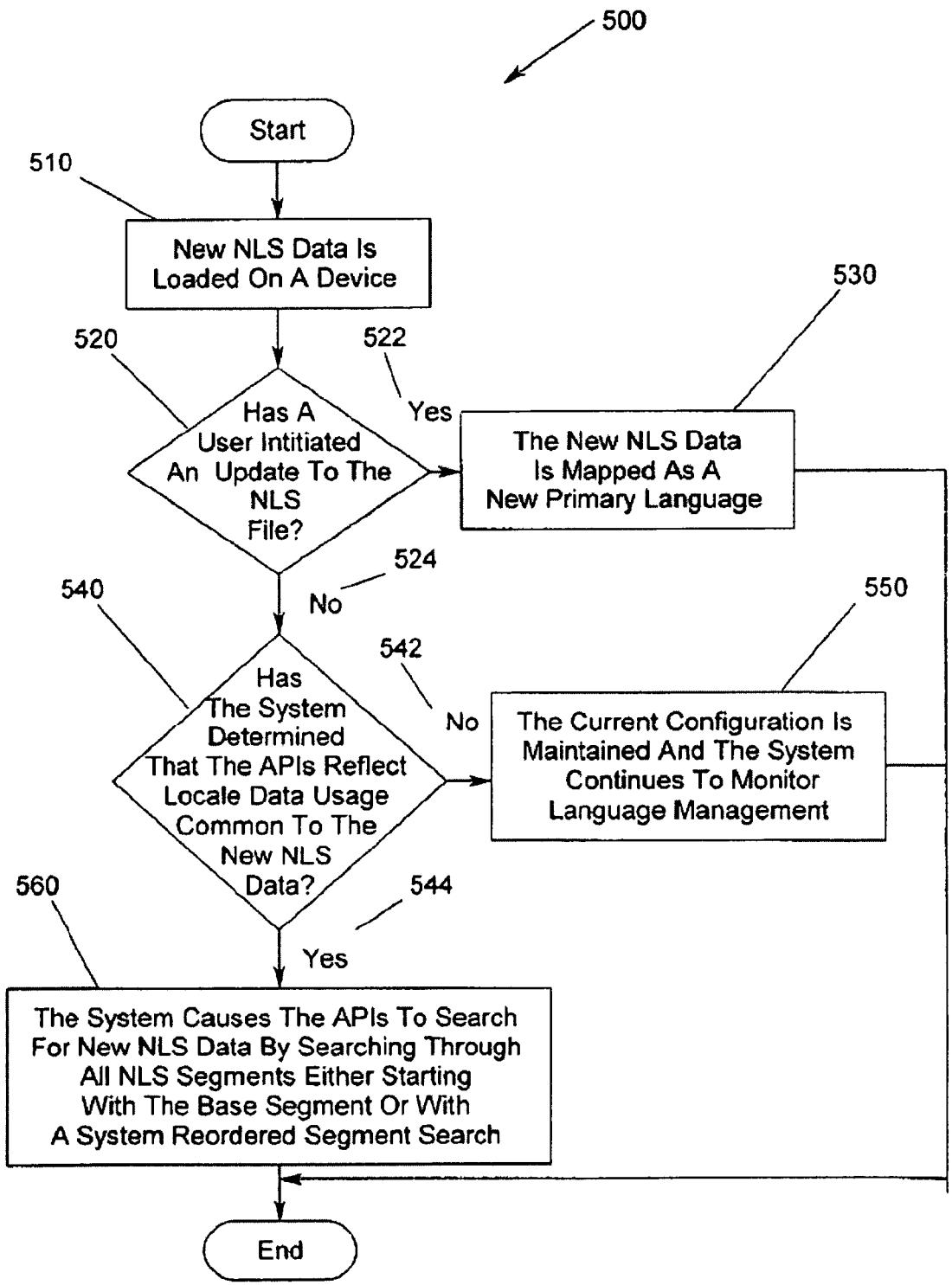
FIG. 5 is a flowchart showing the dynamic updating of NLS according to an embodiment of the present invention.

FIG. 5 is a flowchart 500 showing the dynamic updating of NLS according to an embodiment of the present invention. In FIG. 5, new NLS data is loaded on a device 510. A determination is made whether a user initiates an update to the NLS file 520. If yes 522, the new NLS data is mapped as a new primary language 530. If not 524, the system determines whether APIs reflect locale data usage common to the new NLS data 540. If not 542, the current configuration is maintained and the system continues to monitor language management 550. If yes 544, the system causes the APIs to search for new NLS data by searching through all NLS segments either starting with the base segment or with a system reordered segment search 560.

Accordingly, new data may be dynamically identified as new language information by the language management system (LMS). Languages can also be dynamically mapped as a new primary language so searches are optimized for that language. Determining an order of languages to search may be especially advantageous when multiple languages are present, e.g., Japanese, Chinese and English.

The NLS API is a collection of APIs used for writing locale-aware applications that make an application usable across multiple language platforms. In addition, the NLS API provides functions to obtain or modify locale-related settings, including facilitating locale-dependent operations, such as string sorting, time and date formatting, providing procurrency formatting, and calendar formatting; and providing code page API and string conversion support for applications using ANSI or DBCS strings Virtual NLS uses a simple wrapper design model to retrofit the existing public and internal NLS APIs. Thus, existing APIs may be used for obtaining locale information. APIs that query a single monolithic NLS file may be wrapped so that the API will actually iterate through all the known NLS segments (Segments 410-340 shown in FIG. 3) on the device in a specified search order. This allows APIs to be reused and allows the new infrastructure to be used in the exiting software calls.

More specifically, the wrapper model takes all NLS functions that directly access NLS data and exposes them through a set of wrappers that call into them, specifying a specific segment each time. For example, for the NLS function GetLocaleInfo, a callable wrapper called NlsWrapper_GetLocaleInfo is created containing the code previously contained in GetLocaleInfo. Then GetLocaleInfo is written to iterate through the NLS segments in a well-defined order and calls NlsWrapper_GetLocaleInfo each time. For some APIs, the NlsWrapper_<Function Name> is called conditionally only if the locale specified by the API parameter is present in the NLS segment. This check is made by quickly searching through the Locale File Pointers table using a binary search. These APIs then use a dynamically updatable search table to identify the memory-mapped NLS segment corresponding to the requested locale data. At any point, the searchable table may be updated, without notifying the public APIs changing the loaded memory-mapped content.

Referring again to FIG. 3, NLS segments 310-340 are searched sequentially when a public or internal NLS API needs to locate specific data. As such, the search order of segments is important. First, the base NLS segment 310 is searched. Typically, the base segment 310 includes the majority of the NLS data. By ensuring that most of the NLS data is in this segment 310 and optionally performing dynamic search optimizations, Virtual NLS demonstrates performance characteristics that are almost identical to the monolithic NLS solution.

However, Virtual NLS also allows dynamically modifiable search order. Dynamically modifiable search order allows the search of frequently used language family segments to be reorganized based on the LCID. For example, if Chinese locale information is continually requested on an English-based device, Virtual NLS can "flip" the search order to optimize for querying for Chinese data. This re-order operation can be performed at various stages: when the API is called; when the user-default language changes; or, by maintaining run-time statistics on the most frequently used languages. This re-ordering is possible because of the symmetric relationship between NLS segments.

Embodiments according to the present invention provide flexibility and the ease of use that are simply not possible using the alternative methods. For example, one possible alternative to embodiments of the present invention is to add a language and saved it out so it could be removed. However, this requires extra processing and wastes a lot of space. In other words, multiple NLS files are on the device. However, instead of just pointing to those files, the device goes ahead and reads all the files once and merges those files into one file either in RAM or writes it back out for later use. Such a process would take a prohibitively long time, especially because there is duplicate information in the two files.

Yet, another alternative is to simply replace one file with another. However, this approach is not optimal because it creates additional overhead. For example, if a basic worldwide NLS file exist, and the basic worldwide NLS file does not provide locale information for East Asia, then to provide Japanese locale information the file must be recreated such that the new file has all the previous worldwide information plus Japanese. If later Chinese needs to be added, the device must create another file that has both the worldwide information, Japanese locale information and Chinese local information. This process is not only very inefficient, but determining what is on the device is also a problem. The user must know up front all the languages that might be used.

Yet, another alternative is to use image update technology. Instead of replacing the NLS file, it may be updated with additional information. Nevertheless, this method suffers from many of the same problems because all of the files must be known up-front. Still another approach is to merge two NLS databases at boot-time. The disadvantages were that the merge is essentially a one-way operation: disentangling the NLS pieces again is a CPU and memory intensive operation. In addition, doing the actual merge, in the first place, at boot-time could take up to 20 seconds or worse depending on the device.

In contrast, as described above, embodiments of the present invention enable dynamic and efficient updates to NLS files. The use of NLS file segments in the Virtual NLS file allows NLS to be dynamically configured using a NLS segment for each language type. Language hotfixes may be easily installed, possibly even wirelessly. The Virtual NLS file also does not impact device performance or significantly increase the ROM footprint (size). The Virtual NLS allows the user to decide which language to install on the device. Segments may be organized by language family. The number of segments that need to be searched is also minimized. At any point, any of the pointers for the dynamically updatable query table can be shifted around to improve performance. Existing APIs may be used for obtaining locale information by causing the APIs to iterate through all the known NLS segments in a specified search order.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-readable storage device comprising computer executable instructions which, when executed by a computer, will cause the computer to perform a method of providing a virtual national language support file, the method comprising:

providing a plurality of national language support file segments, the plurality of national language support file segments including a national language support base segment providing first locale data and a plurality of locale file pointers, each of the plurality of local file pointers comprising a table containing a locale identification and a file offset pair for each of a plurality of locales contained in the virtual national language support file, the file offset comprising at least one of Unicode data and sortkey data, the table being sorted by the locale identification in an increasing order, the plurality of national language support file segments further including at least one national language support segment for providing second locale data; and logically binding the plurality of national language support file segments in a wrapper.

2. The computer-readable storage device of claim 1, wherein the national language support base segment is configured to be searched first.

3. The computer-readable storage device of claim 1, wherein the national language support base segment is organized to provide a majority of national language support data anticipated to be queried.

4. The computer-readable storage device of claim 1, wherein the plurality of national language support file segments are configured to allow independent updates to locale data contained therein.

5. The computer-readable storage device of claim 1, wherein the plurality of national language support file segments are dynamically updatable by a user.

6. The computer-readable storage device of claim 1, wherein the plurality of national language support file segments are organized by language families.

7. The computer-readable storage device of claim 1, wherein the plurality of national language support file segments minimizes a number of segments that need to be searched.

8. The computer-readable storage device of claim 1, wherein the plurality of national language support file segments are searchable using a dynamically modifiable search order.

9. The computer-readable storage device of claim 1, further comprising searching the plurality of national language support file segments using a dynamically modifiable search order.

10. The computer-readable storage device of claim 9, wherein the dynamically modifiable search order comprises reorganizing the search of frequently used national language support file segments based on the locale identification.

11. A method for providing a virtual national language support file, comprising:

providing, by a mobile computing device, a plurality of national language support file segments, wherein the plurality of national language support file segments include a national language support base segment providing first locale data and a plurality of locale file pointers, each of the plurality of locale file pointers comprising a table containing a locale identification and a file offset pair for each of a plurality of locales contained in the virtual national language support file, the file offset comprising at least one of Unicode data and sortkey data, the table being sorted by the locale identification in an increasing order, the plurality of national language support file segments further including at least one national language support segment for providing second locale data;

logically binding, by the mobile computing device, the plurality of national language support file segments in a wrapper; and searching, by the mobile computing device the plurality of national language support file segments using a dynamically modifiable search order, the dynamically modifiable search order comprising reorganizing the search of frequently used national language support file segments based on the locale identification.

12. The method of claim 11 further comprising performing query searches using the national language support base segment first.

13. The method of claim 11 further comprising configuring the national language support base segment to provide a majority of national language support data anticipated to be queried.

14. The method of claim 11 further comprising performing independent updates to locale data contained in the plurality of national language support file segments.

15. The method of claim 11 further comprising dynamically updating the plurality of national language support file segments.

16. The method of claim 11 further comprising searching the plurality of national language support file segments in a manner that minimizes a number of segments that need to be searched.

* * * * *